US008799326B2

(12) United States Patent
Wiemann

(10) Patent No.: US 8,799,326 B2

(45) Date of Patent: Aug. 5, 2014

(54) SYSTEM FOR MANAGING ELECTRONICALLY STORED INFORMATION

(75) Inventor: Scott Harvey Wiemann, Lakeville, MN (US)

(73) Assignee: Thomson Reuters Global Resources, Baar (CH)

(*) Notice: Subject to any disclaimer, the term of this patent is extended or adjusted under 35 U.S.C. 154(b) by 265 days.

(21) Appl. No.: 12/751,554

(22) Filed: Mar. 31, 2010

(65) Prior Publication Data

US 2011/0246532 A1 Oct. 6, 2011

(51) Int. Cl.

*G06F 7/00* (2006.01)
*G06F 17/30* (2006.01)

(52) U.S. Cl.

USPC .......... 707/802; 707/942

(58) Field of Classification Search

CPC .......... G06F 17/30699; G06F 17/3071; G06F 17/30705; G06F 17/30707
USPC .......... 707/802–805, 942
See application file for complete search history.

(56) References Cited

U.S. PATENT DOCUMENTS

| | | | | |
|---|---|---|---|---|
| 7,007,232 | B1 | 2/2006 | Ross et al. | |
| 7,793,258 | B2 | 9/2010 | Sundararajan et al. | |
| 7,870,577 | B2 | 1/2011 | Haberman et al. | |
| 8,078,451 | B2 | 12/2011 | Dolan et al. | |
| 8,195,666 | B2 | 6/2012 | Jeavons | |
| 2002/0065677 | A1 | 5/2002 | Grainger et al. | 705/1 |
| 2002/0073121 | A1 | 6/2002 | Sano et al. | |
| 2004/0006743 | A1 | 1/2004 | Oikawa et al. | |
| 2005/0203899 | A1 | 9/2005 | Anderson et al. | |
| 2006/0064434 | A1* | 3/2006 | Gilbert et al. | 707/104.1 |
| 2006/0069685 | A1* | 3/2006 | Dickens et al. | 707/10 |
| 2006/0200756 | A1 | 9/2006 | Politi et al. | |
| 2006/0206490 | A1 | 9/2006 | Schiller | 707/10 |
| 2007/0113169 | A1 | 5/2007 | Gugerbauer | |
| 2008/0033929 | A1 | 2/2008 | Al-Kofahi et al. | |
| 2009/0006953 | A1 | 1/2009 | Perantatos et al. | |
| 2009/0150168 | A1* | 6/2009 | Schmidt | 705/1 |
| 2009/0150906 | A1* | 6/2009 | Schmidt et al. | 719/317 |
| 2009/0249223 | A1 | 10/2009 | Barsook et al. | |
| 2010/0100572 | A1* | 4/2010 | Schiller | 707/805 |
| 2011/0029525 | A1* | 2/2011 | Knight | 707/737 |
| 2011/0246912 | A1 | 10/2011 | Wiemann et al. | |

FOREIGN PATENT DOCUMENTS

| | | | |
|---|---|---|---|
| WO | WO9712334 | A1 | 4/1997 |
| WO | WO2006083241 | A2 | 8/2006 |
| WO | WO2007041688 | A1 | 4/2007 |
| WO | WO2011123384 | A1 | 10/2011 |
| WO | WO2011123385 | A1 | 10/2011 |

OTHER PUBLICATIONS

Anonymous, Surrogate Key, published 2003, ITtoolbox, p. 1-2.*

(Continued)

*Primary Examiner* — Jeffrey A Burke

(74) *Attorney, Agent, or Firm* — Faegre Baker Daniels LLP

(57) ABSTRACT

A system for managing electronically stored information includes a server having a processor and a memory. A database is coupled to the server. A container component is configured in the memory. The container component is configured to store and retrieve incident information from the database. The incident information comprising at least one of metadata and actual data relating to an incident. A relationship component is configured in the memory to provide a relationship between the container component and an artifact using the incident information relating to the incident.

21 Claims, 11 Drawing Sheets

(56) References Cited

OTHER PUBLICATIONS

"Notification of Transmittal of the International Search Report and the Written Opinion of the International Searching Authority, or the Declaration" for PCT/US20011/030160 filed Mar. 28, 2011, date of mailing Jul. 7, 2011, 12 pages.
Communication issued in EP Application No. 11717358.3, mailed Nov. 8, 2012, 2 pages.
Communication issued in EP Application No. 11717796.4, mailed Nov. 8, 2012, 2 pages.
Final Office Action issued in U.S. Appl. No. 12/751,541, mailed May 17, 2013, 14 pages.
International Search Report and Written Opinion issued in PCT/US2011/030162, mailed Jun. 22, 2011, 10 pages.
Non-Final Office Action issued in U.S. Appl. No. 12/751,541, mailed Sep. 26, 2012, 11 pages.

* cited by examiner

SYSTEM FOR MANAGING ELECTRONICALLY STORED INFORMATION

CROSS-REFERENCE TO RELATED APPLICATIONS

This application is related to co-pending application Ser. No. 12/751,541, filed Mar. 31, 2010, and entitled SYSTEM FOR USE IN EDITORIAL REVIEW OF STORED INFORMATION, the content of which is hereby incorporated by reference in its entirety.

BACKGROUND OF THE INVENTION

With the increased use of computers and web-based applications, increasing amounts of information are being made available to end users. As the costs of mass storage of data have decreased, and the speeds at which data can be obtained and transmitted have increased, the number of databases available to end users, and the size of those databases, have increased. Such databases are used to store a myriad of information. Typically, the stored information can be searched and retrieved by an end user via a user interface.

Specialized types of database are used to store information which has been subjected to some type of editorial review. For example, information related to legal proceedings is available through services known as Westlaw® and WestlawNext® provided by Thomson Reuters located in Eagan, Minn. In such services, judicial opinions (from various courts across the United States) are collected and published. The collected opinions are also summarized and classified based on the principles or points of law that they contain. For example, Thomson Reuters creates and classifies "headnotes" which are short summaries of points of law made in judicial opinions using a taxonomy. The taxonomy provided by Thomson Reuters is a hierarchical classification of over 20 million headnotes across more than 90,000 distinct legal topics. Each topic not only has a descriptive name, but also a unique number code known as its Key Number classification.

In addition to legal opinions, many other types of legal documents can be collected, stored, and subjected to editorial review (editorial review is also referred to herein as "editorializing" or "editing"). The process of collecting, storing and editorializing is an example of an editorial process. Exemplary legal documents include but are not limited to briefs filed in connection with a particular case, expert witness reports or testimony, depositions, filings related to particular motions and rulings on those motions, jury instructions, etc. In addition to information in document form, other types of data may be stored in connection with a judicial matter such as audio or videotapes of testimony or evidence, photographs, exhibits, written publications, computer recreations or exhibits, etc. As this raw information (referred to herein as "artifacts") is entered into a particular database, the information is subjected to editorial review in which the information is associated with data which identifies the case or matter to which that information pertains. Other types of editing may occur as well including adding summaries to the information, classifying the information, cross referencing the information with other data, etc.

Typically, the data stored in such a database is arranged in a relational database. Each record in the database is associated with one or more court proceedings. The prior art utilizes an artifact related to a particular judicial proceeding (i.e. a docket or an opinion from the court) to act as a "hub", or a primary key, for the relational database. In such an arrangement, a judicial proceeding is initially associated with a docket such that deposition information, motions, briefs, etc. are related to a specific docket. However, if at a subsequent time a preferred "hub" is developed such as a judicial case being decided, the stored artifacts must be re-indexed and transferred to a specifically published case such as a judicial opinion. Consequently, the present inventors have recognized a need for improvement of a system for managing electronically stored information.

SUMMARY OF THE INVENTION

A system for managing electronically stored information includes a server having a processor and a memory. A database is coupled to the server. A container component is configured in the memory. The container component is configured to store and retrieve incident information from the database. The incident information comprising at least one of metadata and actual data relating to an incident. A relationship component is configured in the memory to provide a relationship between the container component and an artifact using the incident information relating to the incident.

DETAILED DESCRIPTION OF ILLUSTRATIVE EMBODIMENTS

Figure 1:
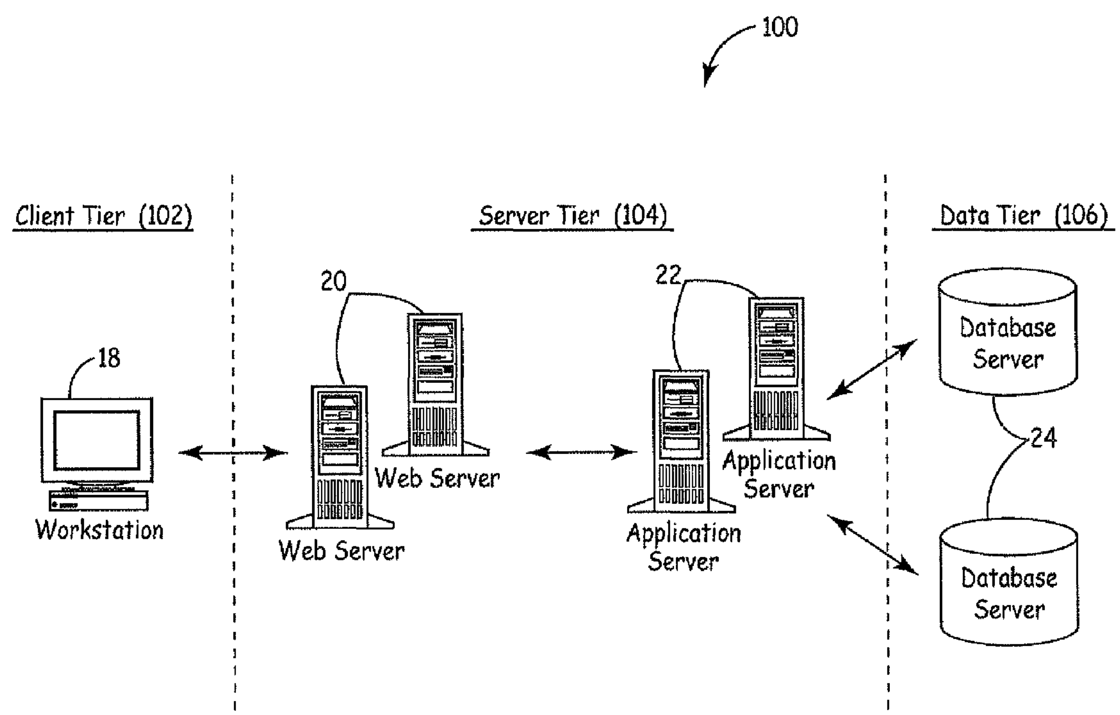
FIG. 1 is a diagram illustrating a client tier, server tier and data tier for use in one configuration of the present invention.

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following exemplary definitions are presented. An "artifact", for example, may refer to a document, or any addressable collection or arrangement of machine-readable data. The term "database", for example, may include a data collection or any logical collection or arrangement of artifacts. In addition, a database may include metadata and other data. The term "overall incident" refers to an entity that includes relationships between one or more legal actions arising out of the same event or series of events. The term "legal action" refers to an entity that includes relationships between one or more court actions regardless of the level of the legal venue. The term "court action" refers to an entity that is inclusive of all actual or potential content, whether artifacts or otherwise, relating to a particular action within a single legal venue. A court action may be contained in more than one legal action.

The present invention provides a system in which a user (typically, the user described herein is a professional editor) can perform an editorial review (i.e., "editorialize") of stored information through a web interface. The web interface provides a unified application and interface architecture and is configured to run a plurality of application components therein. As used herein, the term "unified architecture" refers to a software construct in which a standardized framework is provided for the implementation of application components and the exchange of information between such components. Use of a unified architecture has many advantages. First, it allows the implementation of a consistent graphical user interface across multiple application components. The application components are configured to interact with a user, communicate with one another, and interface with a remote database. Second, it provides an efficient framework for a developer to create new application components and provide a consistent user interface. Third, it reduces the time required to perform an editorial review process of stored information as the various application components within the web interface are configured to share data. As these application components are run at a client tier level, a new application is easily created by a developer without significant modification of software run on an application server which interfaces with the database.

FIG. 1 is a schematic diagram of a system for editorial review of stored information which illustrates a client tier 102, web and application server tier 104 and a data tier 106. In FIG. 1, the client tier is illustrated as a work station 18. The work station 18 is configured to run a web interface and permit interaction with a user as described herein. The work station 18 is connected to server tier 104 over a network connection. In the embodiment shown in FIG. 1, the server tier 104 includes multiple servers, some of which are configured as web servers 20 and others which are configured as application servers 22. This functionality may be shared between servers or implemented individually as desired. The web servers 20 are configured to serve web pages to the work station 18 in accordance with standard communication and programming techniques. The web servers 20 are configured to provide application components to the work station 18 which are run within a web interface on the work station 18. Based upon interaction with the work station 18 by a user, the web servers 20 are configured to interact with the application servers 22. The application servers 22 shown in FIG. 1 are configured to read and write to one or more database servers 24 shown in the data tier 106. These database servers 24 contain various data collections, artifacts and/or metadata associated with the artifacts.

Figure 2:
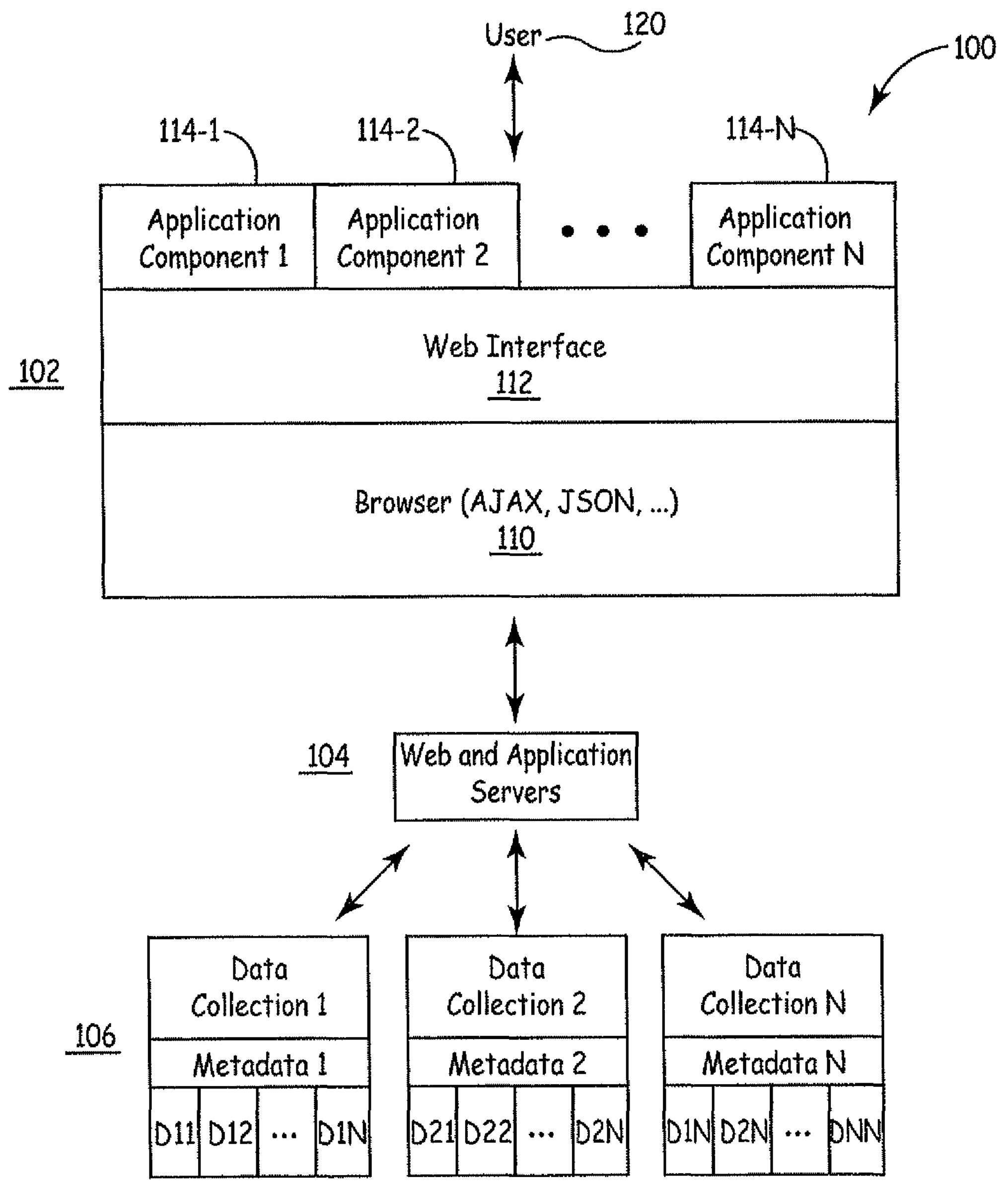
FIG. 2 is a block diagram which illustrates a relationship between an end user and a database shown in FIG. 1.

FIG. 2 is a more detailed block diagram 100 showing client tier 102, server tier 104 and data tier 106. In FIG. 2, the client tier 102 is illustrated as operating as a browser 110. However, any type of application can be used to implement a web interface 112 in which a "work bench" setting is provided. An example of a "work bench" setting includes a unified architecture for implementing the application components 114-1-114-N as well as a standardized user interface 112. This is executed by software in workstation 18. In one particular example, the browser 110 is configured to implement a scriptable language such as AJAX (Asynchronous JavaScript), JAVA, ActiveX, VBScript, or other client/scripting language which may either be compiled or interpreted at the client tier 102 within a browser 110. The browser 110 provides further functionality including functionality in accordance with HTML (Hyper Text Markup Language), XHTML (Extensible Hypertext Markup Language), CSS (Cascading Style Sheet), DOM (Document Object Module), XML (Extensible Markup Language), XSLT (XSL Transformations), XMLHttpRequest, JavaScript, JSON (JavaScript ObjectNotification), etc and/or other standards. A web interface 112 operates in the browser 110 and provides a unified architecture for implementing a plurality of application components 114-1, 114-2 . . . 114-N. The web interface 112 provides a unified architecture allowing the application components 114-1, 114-2 . . . 114-N to operate together using shared resources, communicate with one another and communicate with a consistent interface experience (GUI) to a user 120. The browser 110 communicates with the server tier 104 to receive the web pages (both static and active pages including scripts, etc.) that provide the web interface 112 and the application components 114-1-114-N. Server 22 in server tier 104 communicates with data collections 1, 2, . . . N which are formed by one or more databases implemented in database servers 24 (not shown in FIG. 2) of data tier 106. These databases may be formed by a single database or multiple databases and may be shared across multiple computer systems or locations. Each data collection includes artifacts $D_{11}$, $D_{12}$, . . . $D_{1n}$; $D_{21}$, $D_{22}$, . . . $D_{2N}$; . . . $D_{1N}$, $D_{2N}$, . . . $D_{NN}$. The various artifacts include any type of stored information and comprise, for example, texts, documents, scanned documents or other images, photographs, audio recordings, video recordings, spreadsheets, numerical data, reports, transcripts, exhibits, editorially created headnotes or summaries etc. In addition, these artifacts include any type of relevant data and are not limited to any particular content or format. The metadata 1, 2, . . . N comprises any type of data or information which is used to describe or, comment on or otherwise editorialize the artifacts $D_{11}$-$D_{NN}$. The metadata 1, 2, . . . N information comprises, for example, information that enables linking of various types of artifacts or otherwise group artifacts as desired, relationships between artifacts and metadata or any combination thereof, provides an editorial description of artifacts, provides "key" information to categorize artifacts or other metadata, etc. The databases 24 in the data tier 106 operate in accordance with various database techniques and/or structures known to one of ordinary skill in the art.

The application components 114-1-114-N illustrated in FIG. 2 provide a loosely coupled vertical and horizontal function between other application components. For example, application components 114-1-114-N can share duties between each other (horizontal) as well as depend from another application component 114-1-114-N (vertical) such as using one application component 114-1 to search for artifacts. An example of a horizontal configuration includes a first application component configured to perform a search function used to identify a court action, and a second application component for use in editing headnotes related to the court action found using the search function. An example of a vertical arrangement includes an application component configured to edit headnotes across multiple court actions. In such a configuration, the application component is configured to received the edited headnote information from a user, and implement an embedded secondary application component to search for related court actions having headnotes which should receive similar editing. Multiple application components 114-1-114-N are assembled together to form aggregate, more complex application components. Thus, various functionality of the application components 114-1-114-N are reused between components as desired. Examples include searching functions, histories, cross references, algorithms, etc.

Figure 3:
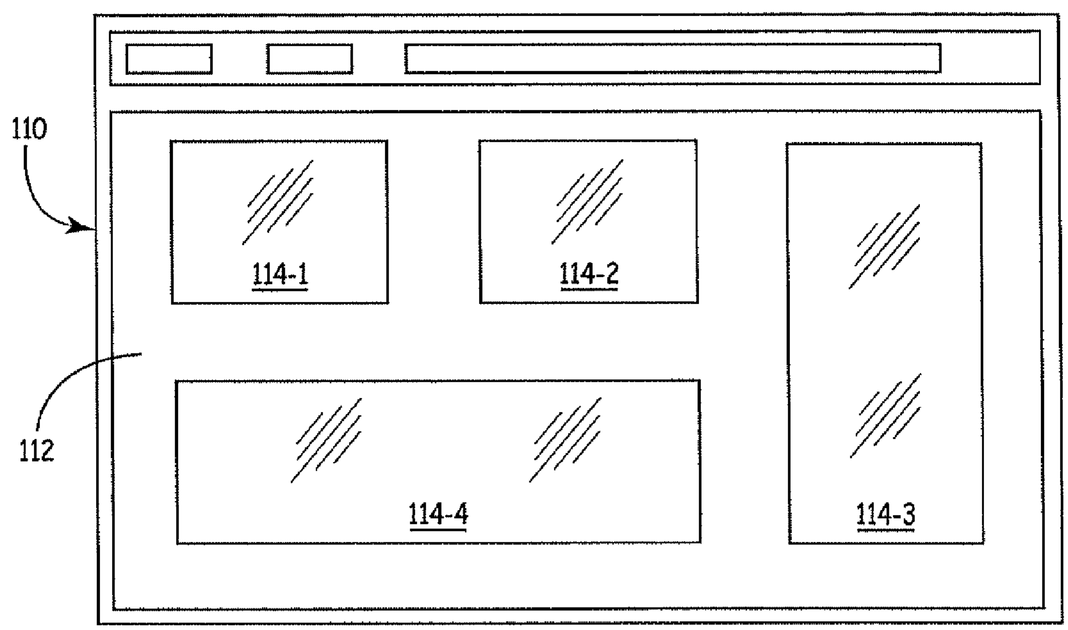
FIG. 3 is a diagram of a web interface for use by a user.

FIG. 3 is a visual example showing application components 114-1 . . . 114-4 implemented in a web interface 112 of a browser 110. Although the various application components 114-1-114-N are illustrated as being displayed simultaneously in a single page of a web browser 110, the various application components 114-1-114-N operate in the background, or may operate in other windows or tabs of the browser 110 and are not necessarily required to provide a visual output to a user. The application components 114-1-114-N are configured to share data between one another. For example, components 114-1-114-N exchange user inputs and other information with one another. In addition, components 114-1-114-N are configured to communicate with the data tier 106 shown in FIG. 2. In this example, the web interface 112 operates within a browser 110. However, the web interface may comprise a standalone software component which operates independently of a browser 110. In either case, the application components 114-1-114-N are used to provide common functionality, for example, searching functions, security, user input, etc. and provide a common look and feel across all of the user interfaces.

Figure 4:
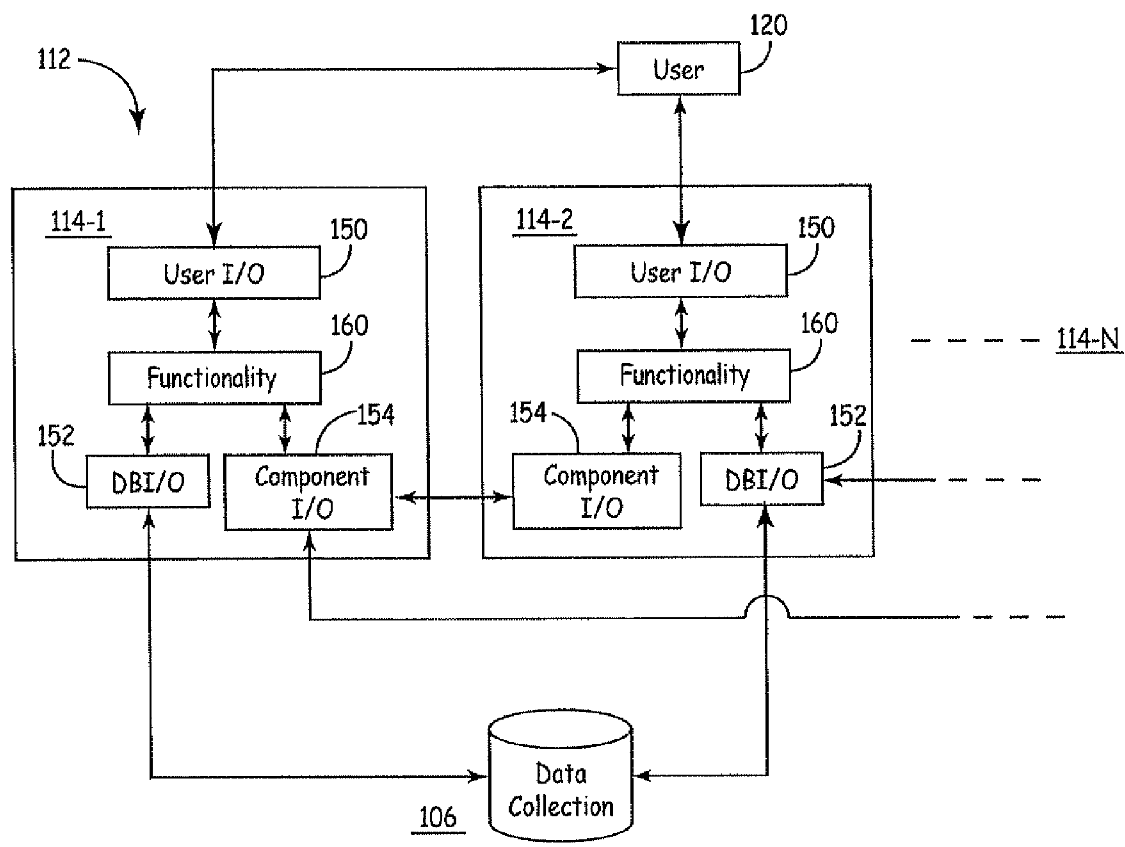
FIG. 4 is a diagram which shows interaction between application components which run in the web interface shown in FIG. 3.

FIG. 4 is a simplified block diagram showing application components 114-1 and 114-2 implemented in the web interface 112. The application components 114-1-114-2 each include a user I/O component 150 which is configured to communicate with a user 120. Typically, the user I/O component 150 comprises a graphical user interface 112 which visually displays information to user 120 and receives information from user 120 using a standard device such as keyboard, touch screen, mouse, etc. Each application component 114-1-114-2 also includes a database access (I/O) component 152 configured to communicate with a data collection of the data tier 106. Additionally, each application component 114-1-114-2 includes an application communication component 154 identified as "Component I/O" in FIG. 4. The application communication components 154 are configured to communicate data or a function of the data (i.e. editorial content) between application components 114-1-114-N. An example of a function of the data is the user clicking an "ACCEPT" button, then the communication is information to populate fields about the case (name, parties, keynotes, etc), rather than the communication of clicking of the "ACCEPT" button. Other communications include, for example, a direct communication, a broadcast communication, a polling technique, a configuration in which all other communications are received from other application components, etc. In some communication techniques, an application component 114-1-114-N includes a unique, partially unique, or shared identifier which provides an address for use in communication. The application components 114-1-114-2 also include a functionality component 160 which provides some type of functionality to the application components 114-1-114-2. The particular operation of functionality component 160 is configured as desired. Examples include search functions, functions which automate data entry, functions which are used to identify related data artifacts, functions which identify errors in data entry such as a spell check function, and functions which are used to simplify data entry (for example, a function which simplifies the entry of metadata, by identifying a particular court or jurisdiction from which the artifact arises). Additional examples include functions which show a history related to a particular artifact and functions which provide an automatic link between potentially related data artifacts, automatic calendaring functions, etc. Any number of functionality components 160 are implemented in an application component 114-1-114-2 and functionality components 160 operate independently or are made to operate in an interdependent manner. Although only two application components 114-1-114-2 are illustrated in FIG. 4, any number of application components 114-1-114-N are implemented within the web interface 112.

During operation, information is displayed to user 120 for use in an editorial review process in which artifacts in the data collection are subjected to editorial review and editorialized, as desired. The artifacts are edited directly. However, in some instances the editing is performed on the metadata associated with an artifact. In these instances, in response to the display, the user 120 selectively responds through the user interface component 150. The response includes any type of editorial response including, for example, accepting the displayed information without change, modifying the displayed information, modifying or adding metadata related to an artifact stored in the data collection of the data tier 106, linking various artifacts or metadata together, modifying the function performed by the functionality component 160, etc. Turning to a specific example, a first application component 114-1 can provide a search function used to locate an artifact. The user selects a located artifact and views it and/or its metadata in a second application component 114-2. The user selects a field for editing which then populates a third application component 114-3 with information such as metadata which is revised. Any changes in the metadata are communicated to a fourth application component 114-4 which is configured to identify related artifacts stored in a data collection 106. The editorial changes are also used to modify the metadata stored in the data collection 106. Thus, the burden on the user to enter data is reduced.

Figure 5:
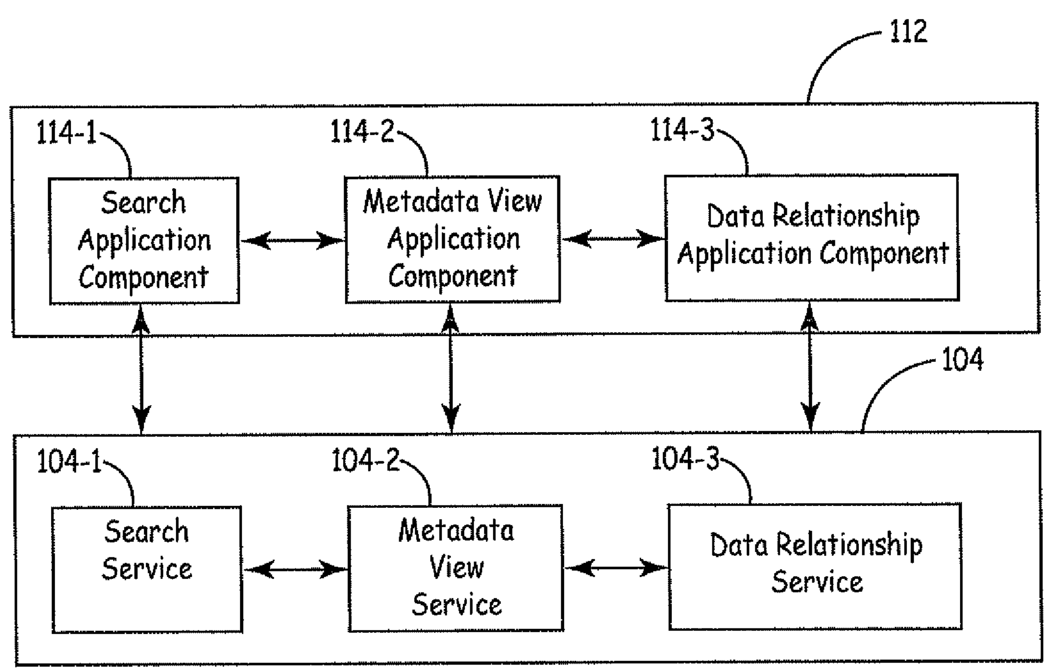
FIG. 5 is a diagram showing a relationship between application components and services run on a database server.

FIG. 5 is a block diagram showing one example configuration of application components 114-1-114-3. In the configuration of FIG. 5, three different application components are illustrated 114-1, 114-2, 114-3. A search application component 114-1, a metadata view component 114-2, and a data relationship application component 114-3 are provided. Each application component 114-1, 114-2, 114-3 provides a graphical user interface user 120 illustrated in FIG. 4. As illustrated in FIG. 5, application components 114-1-114-3 are configured to share data and communicate with other application components. Further, the application components 114-1-114-3 interact with servers 20 and 22 illustrated in FIG. 2. Servers 22 operate on data servers 24 of the data tier 106 (not shown in FIG. 5). The server tier 104 is configured to provide various services which are accessible by application components 114-1-114-N. In the example of FIG. 5, a search service 104-1 is provided. The search service 104-1 searches for and retrieves various data (artifacts) in the data collections 106 illustrated in FIG. 2. The searching functionality of the service is implemented using any appropriate search technique. A metadata view service 104-2 is also provided which is used to review metadata from the data collections illustrated in FIG. 2. The metadata view application component 114-2 accesses the metadata view service 104-2 such that a user views the metadata. A data relationship service 104-3 is provided which, in one example, is used to identify relationships between artifacts $D_{11}, D_{12}, \ldots D_{1n}; D_{21}, D_{22}, \ldots D_{2N}; \ldots D_{1N}, D_{2N}, \ldots D_{NN}$ stored in the database 24. For example, in the case of a court action, the data relationship service 104-3 is configured to identify information arising from a particular lawsuit.

The configuration shown in FIG. 5 allows a user 120 to search for stored data, view metadata and view or modify a relationship between two sets of retrieved data. In an exemplary embodiment, stored documents all having a relationship to a lawsuit are retrieved by a user 120. The user 120 may view each relationship and either approve the relationship, delete the relationship (i.e. a particular legal document may be associated with an incorrect lawsuit or court matter), or modify the relationship. This process of editorializing the data is achieved using the application components 114-1-114-N which operate within the web interface 112.

As used herein, application components are capable of providing a user interface component that implements a loosely coupled "vertical" function. In other words, the application component provides functionality such that multiple application components can be assembled to form more complex application components. Examples of application components include reusable components such as a search function, a specific type of lookup function such as a capability to look up a judicial authority, or an inbox function for receiving data. An example of a more specialized application component is an application component which provides a historical relationship view between artifacts. A "page" can contain any number of application components. A page can comprise, for example, a page or a tab within a browser which provides a web interface, or a standalone application. The page is used to assemble application components onto single or multiple screens and, optionally, introduce coupling between application components. For example, the entire user interface needed for a tool which summarizes data can be implemented in a single page.

A web interface such as browser or other stand alone application is configured to implement one or more pages. This allows multiple pages which are related to be grouped together and may optionally introduce coupling between pages such that data from one page can be exchanged with data from another page using a communication component 154 as described above. Thus, a web interface is capable of providing a "work bench" in which related application components are assembled together to provide a platform in which a related group of application components are provided and operate as "tools" for use by a user. The web interface can implement common functionalities such as security and supports a common look and feel across multiple user interfaces.

The database 24 of the data tier 106 stores information in "containers." These containers are arranged in, for example, a relational database in which the containers act as keys for a grouping of attributes. In one example configuration, the container functions as a primary key in the database. This key may be a natural tribute of the incident, such as a docket number for a court action, or may be a surrogate key. In some situations, a surrogate key may be preferable because there may not be a unique natural attribute to function as a primary key, or a natural attribute for the incident may not yet be available. Further, a foreign key can be used in which the key refers to a key in another database structure.

A container component provides an entity that is produced by relating some or all of the artifacts associated with a particular action or incident to the container component. Preferably any type of relevant data associated with an incident (i.e., incident information) is collected in an incident container component. Note that the database described herein may include multiple incidents and the incidents may include any number of sub-incidents and, in some configurations, may not include any sub-incidents. As used herein, "incident" describes a top level incident, as well as sub-incidents, which can include but is not limited to overall incident, legal action and court action. As used herein, "incident information" includes information which arises from or is in some way related to an incident. In addition, as used herein, "container component" and/or "incident container component" describe a top level incident container, as well as sub-incident container, which can include but is not limited to overall incident, legal action and court action. Furthermore, an incident or sub-incident may be created without containing incident artifact data. For example, if a motion is related to a court action, a secondary key may be implemented to identify this motion without having any further information such as what the motion relates to, the specifics of the particular motion, filings related to the motion, etc.

In an exemplary embodiment, artifacts are associated with a particular incident container component using an automated process. The automated process includes a confidence index, a threshold amount or any other technique known to one of ordinary skill in the art for determining what, if any, artifacts should be manually reviewed and/or processed automatically. A manual review is triggered if there is a sufficient likelihood that the artifact cannot be correctly associated with a particular incident. In some instances, the incident container component is used during an editorial process to manage artifacts and/or other data such as metadata that is related to a particular incident (examples described herein). An artifact stored in a container is information from an external source. Metadata stored in a container is information which describes the artifact or describes other metadata. The metadata itself can be created from, or include, an artifact. In other instances, an incident container component is used by an end user to perform search functions and other tasks across one or more incident containers. Examples of metadata include characteristics describing an incident such as data, location, and type of subject, characteristics describing a legal action such as parties involved, courts, and dates, characteristics describing a court action such as parties, courts, judges, attorneys, and classifications, characteristics describing a sub-action such as the outcome and characteristics describing a legal sub-action such as an outcome.

Figure 6:
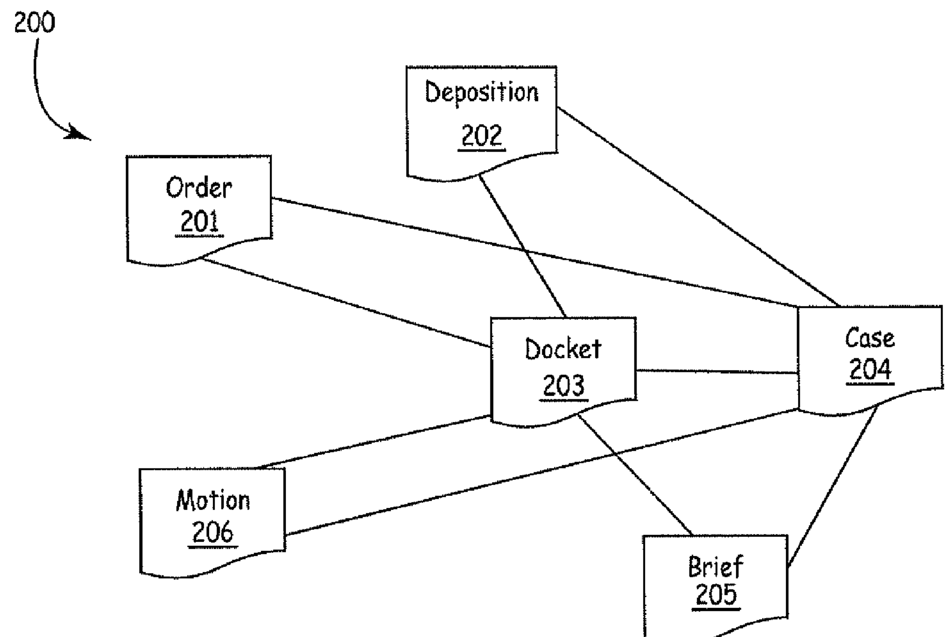
FIG. 6 is a diagram of a prior art configuration of a system for managing electronically stored information.

The following discussion describes an incident container in the context of judicial proceedings. However, in one aspect, the present invention is not limited to this specific implementation. FIG. 6 is a diagram of a prior art system for managing electronically stored information related to a judicial proceeding. System 200 of FIG. 6 illustrates the following artifacts or metadata: a docket 203, a case 204, a motion 206, a brief 205, a deposition 202 and an order 201. In this configuration, one of the artifacts related to a particular judicial proceeding such as a docket 203 or an opinion from the court (not shown) acts as a "hub" or a primary key for the relational database. In such an arrangement, a judicial proceeding may be initially associated with a docket 203 such that deposition information 202, motions 206, briefs 205, etc. are related to a specific docket 203. However, if at a subsequent time a preferred "hub" is developed such as a judicial case being decided, the stored artifacts must be re-indexed and transferred to a specifically published case such as a judicial opinion.

Figure 7A:
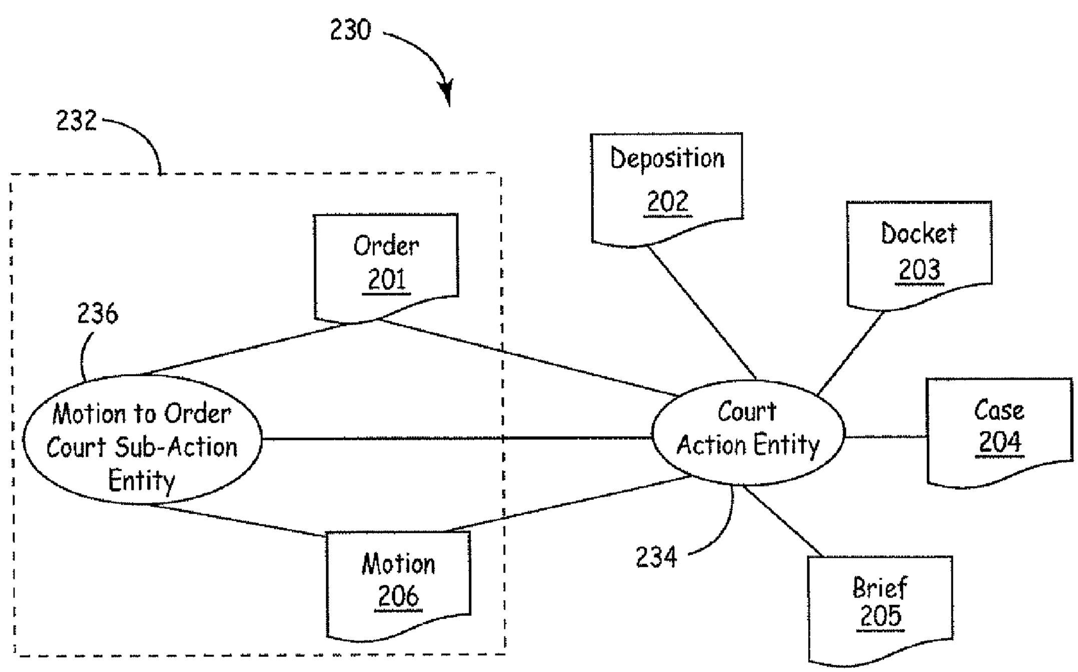
FIG. 7A is a diagram of a system for managing electronically stored information in accordance with the present invention including an incident container and a sub-incident container.
Figure 7B:
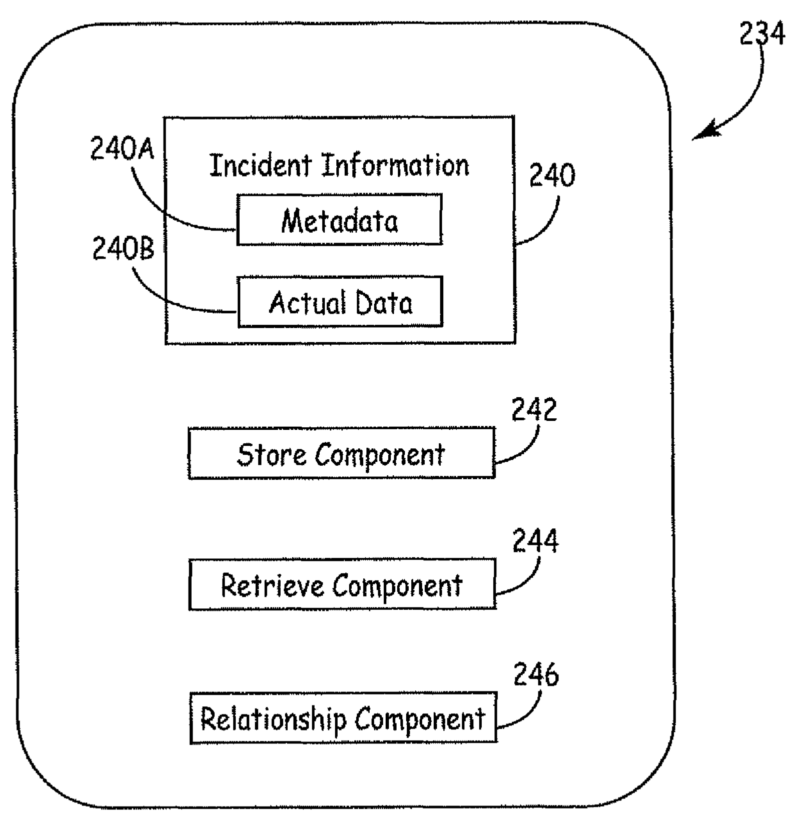
FIG. 7B is a more detailed view of a container component.

FIG. 7A is a diagram showing a system for managing electronically stored information in accordance with one example embodiment of the present invention and illustrates an incident 230. In the configuration illustrated in FIG. 7A, a "Court Action Entity" operates as an incident container component 234. FIG. 7B is a more detailed view of container component 234 which provides a Court Action Entity. Container component 234 includes incident information 240 which includes metadata 240A and actual data 240B. The actual data 240B includes information arising from an actual or natural source, a deposition, testimony, a brief, etc. The metadata 240A provides information which describes the actual data 240B, or describes other metadata 240A. The artifacts may be embodied in the actual data 240B and/or the metadata 240A. For example, the artifact may comprise artifact metadata without comprising actual data relating to the artifact. The incident information may include data such as an indicator of completeness, key sight information, etc. A store component 242 is provide and used to store incident information in the database. Similarly, a retrieve component 244 is provided and used to retrieve stored incident information from a database. A relationship component 246 provides a relationship between the container component 234 and an artifact using incident information 240 which relates to an incident.

Referring back to FIG. 7A, a sub-incident container 232 is provided. The sub-incident 232 relates to a motion being brought before the court and a resultant order and includes a sub-incident container 236. The sub-incident 232 is referenced to a secondary or sub-key identified in the Figure as "Motion to Order Court Sub-Action Entity" provided by sub-incident container 236 to which the order and motion from sub-incident 232 is indexed. Further, FIG. 7A also shows a relationship provided between the Court Action Entity 234 and the Motion to Order Court Sub-Action Entity 236. Although only a single sub-incident container component 232 is illustrated in FIG. 7A, any number of container components may be included within an incident container component. Furthermore, this hierarchy is not limited to a single layer of sub-incident container components and sub-incident container components may themselves container further sub-incident container components. An example of a secondary sub-incident container component layer is an objection brought during a particular motion and the resultant ruling on that objection. Note that in the configuration illustrated in FIG. 7A, the data structure uses surrogate keys whereby the artifacts do not need to be reindexed if a key changes as a court action progresses. This is in contrast to the configuration shown in FIG. 6. In the example of FIG. 7A, the deposition 202, case 204, brief 205, order 201, docket 203 and motion 206 are examples of artifacts comprising incident information which arises from a particular incident. These artifacts also comprise metadata which relates to the incident. Examples of such metadata include headnotes, summaries, names of parties, attorneys, judges, filing dates, venue, docket number, etc. Further, this metadata includes a relationship component which is configured to provide a relationship between the incident container component 234, or sub-incident container component 232, and an artifact.

The container component 234 illustrated in FIG. 7A includes any number of attributes. Table 1 provides an example list of attributes, along with a source from which this information is collected. These attributes are metadata relating to the incident and which provide information related to the particular court action.

| Court Action Entity Metadata | |
|---|---|
| Data | Source |
| Plaintiff | Docket |
| Defendant | Docket |
| State | Docket |
| County | Docket |
| Court | Docket |
| Attorneys | Docket |
| Judge | Docket |
| Firms | Docket |
| Action Begin Date | Docket |
| Experts | Testimony |
| Case Type | Testimony |
| Action End Date | Case |
| Topic & Key | Case |
| KeyCite Indicator | Case |
| Artifact Types | All |
| Completeness | All |

In this example, "Topic & Key" and "KeyCite Indicator" relate to information used to identify and group aspects of a particular legal proceeding. The "Artifacts Types" metadata provides a list of the types of artifacts which have been collected for the particular court action. The "Completeness" attribute contains information which provides an indication of the progression of a particular legal proceeding from its beginning to end, or an indication of the extent to which particular items related to a court action are not yet included in the container. This information is used during an editorial process such that incomplete incidents in a database 24 are identified and updated accordingly.

Figure 8:
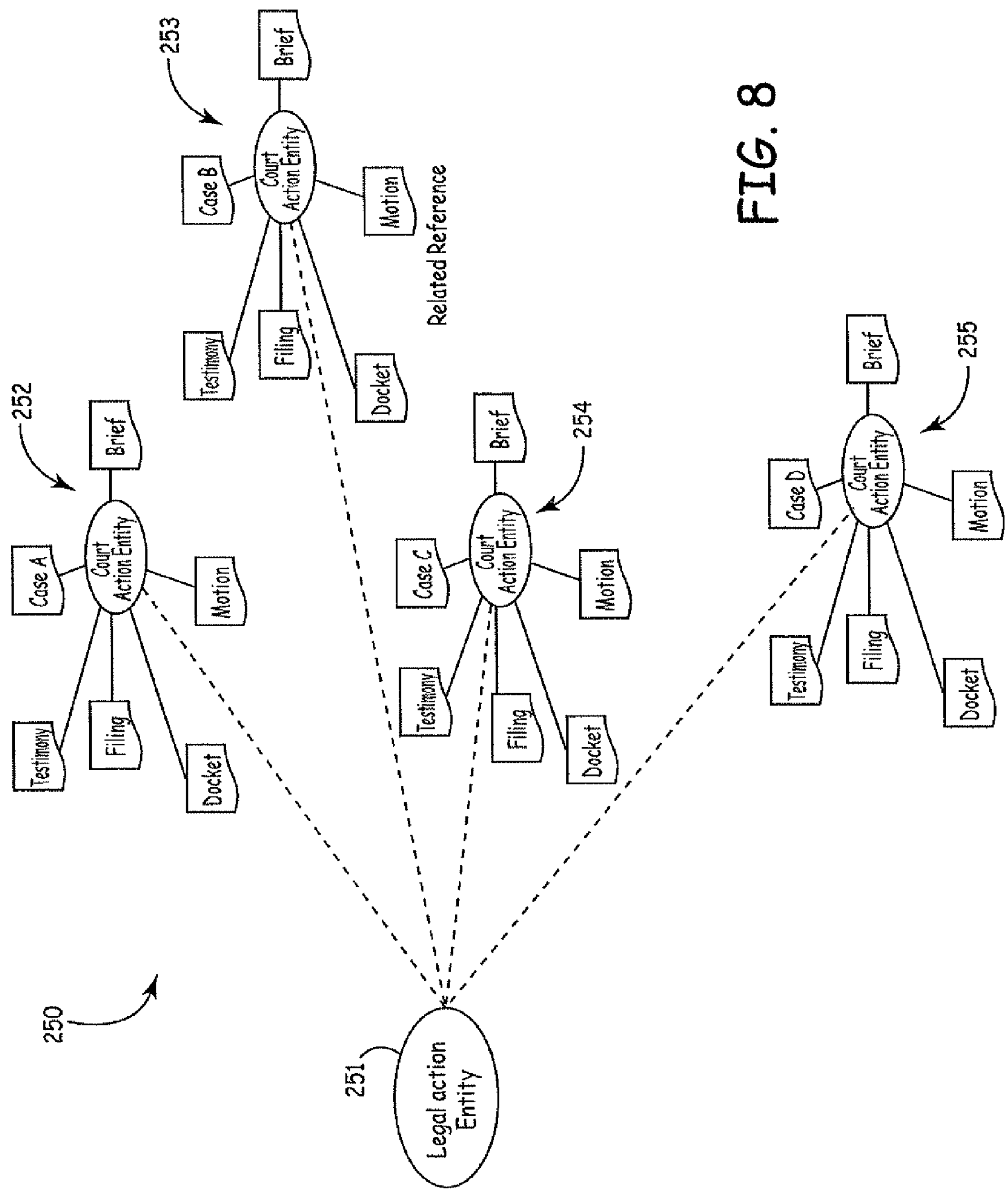
FIG. 8 is a diagram similar to FIG. 7A showing multiple sub-incidents.

FIG. 8 shows a system in which a legal action 250 is provided which encompasses a Legal Action Entity 251 multiple cases: Case A 252, Case B 253, Case C 254 and Case D 255. Each of the cases may further include any number of artifacts. In this example, each case includes testimony, briefs, motions, docket information and filing information. Relationships are provided between court action entity and artifacts within a court action entity in addition to relationships between legal action entity and court action entity. This configuration illustrates a system for grouping multiple related cases all arising out of the same overall legal action. As a specific example, a product recall is a legal action where multiple cases dealing with the same product recall are filed in various jurisdictions around the United States. FIG. 8 illustrates a legal action 250 which is an example of an incident container component which groups related cases. The legal action 250 contains any number of attributes and examples are illustrated in Table 2:

| Legal Action Entity Metadata | |
|---|---|
| Data | Source |
| Plaintiff | Court Action 1 |
| Defendant | Court Action 1 |
| Courts | Court Action 1 |
| | Court Action 2 |
| | Court Action 3 |
| Action Begin Date | Court Action 1 |
| Action End Date | Court Action 3 |
| Judges | Court Action 1 |
| | Court Action 2 |
| | Court Action 3 |
| Firms | Court Action 1 |
| | Court Action 2 |
| | Court Action 3 |

-continued

| Legal Action Entity Metadata | |
|---|---|
| Data | Source |
| Attorneys | Court Action 1<br>Court Action 2<br>Court Action 3 |
| Number of Citing References | KeyCite |
| Number of Negative Citing References | KeyCite |

In this example, "Plaintiff" and "Defendant" relate to the names of the parties in the legal proceeding. While in this specific example, the names of the parties were extracted for "Court Action 1," other examples include the addition of other plaintiffs and defendants in other court actions. In another example, the configuration illustrated in FIG. 8 groups matters arising from a legal action as it progresses from an initial court case, through an appeal process and potentially to a decision at a Supreme Court level. In some instances, the cases are identified using surrogate keys. This is beneficial when briefs are being collected related to an appeal which has not yet received a docket number or other identifying information. In such a situation, the surrogate key is useful because the specifics of the case have not yet been developed in a manner by which the case can be uniquely identified.

Figure 9:
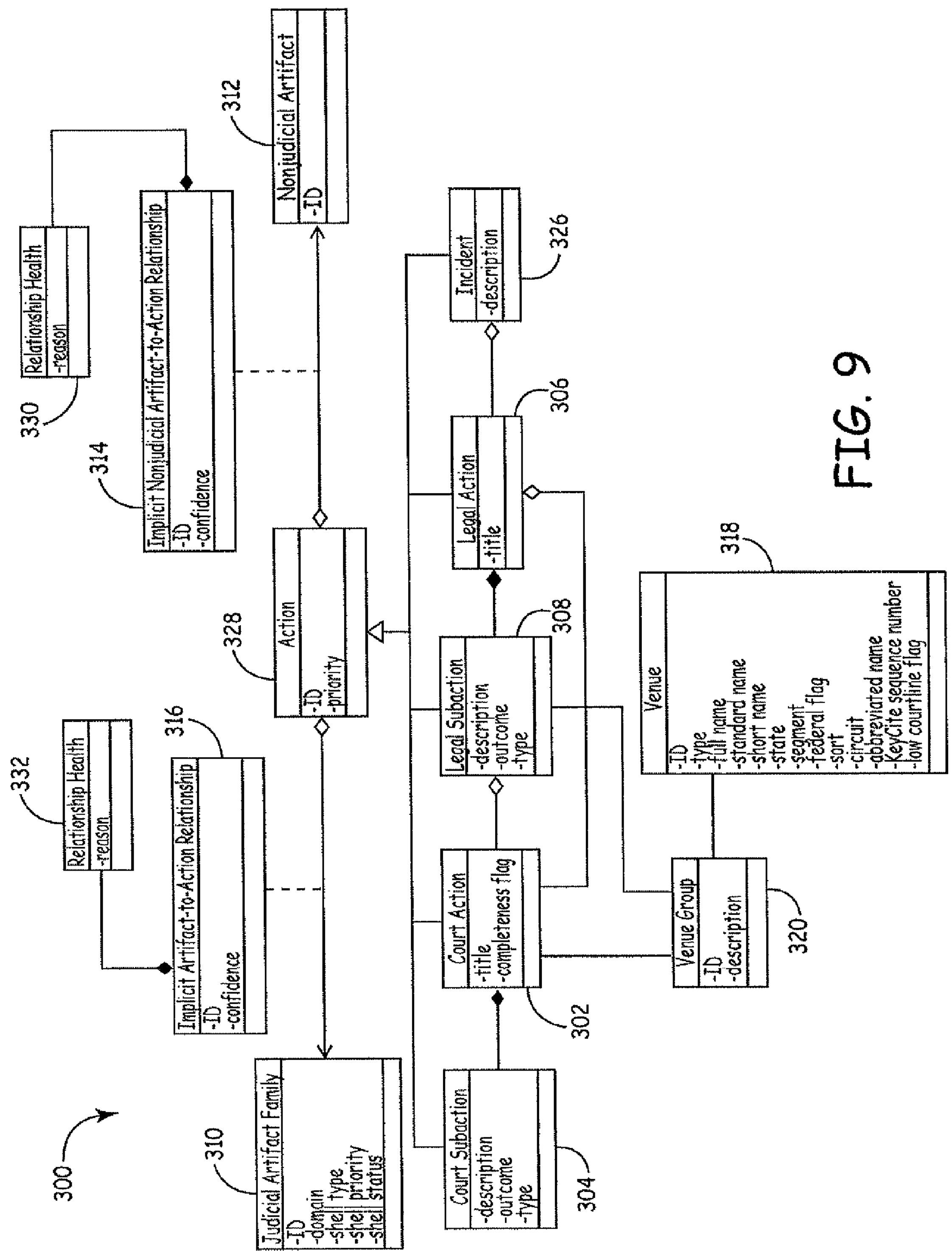
FIG. 9 is a diagram showing artifacts and metadata in a system for managing electronically stored information.

FIG. 9 shows a configuration of an incident container component 300 which includes a number of different sub-incident container components. For example, an overall incident is related to a natural or man made disaster and include a number of different legal proceedings including court action 302 and sub-action 304, legal action 306 and sub-action 308, judicial artifact 310, and non-judicial artifact 312. Examples of non-judicial artifacts include relevant statutes, news articles or stories, corporate information or structures, scientific or engineering information, and information related to taxes or accounting. FIG. 9 also illustrates venue related information 318, 320 as a sub-incident. Further, FIG. 9 shows an overall incident 326 in which all of the elements in incident container component 300 relate. Similarly, all of the elements in incident container component 300 can be tied to a single action 328 which gives rise to all of the other components illustrated. Note that components 314 and 316 are in such a relationship. FIG. 9 also illustrates implicit relationships 314 and 316. These components include sub-containers which provide a relationship health component 330 and 332, respectively. These provide metadata which give an indication of the "health" or of the implicit relationship. For example, this can provide information which gives some indication of the likelihood that the implicit relationship is accurate.

Figure 10:
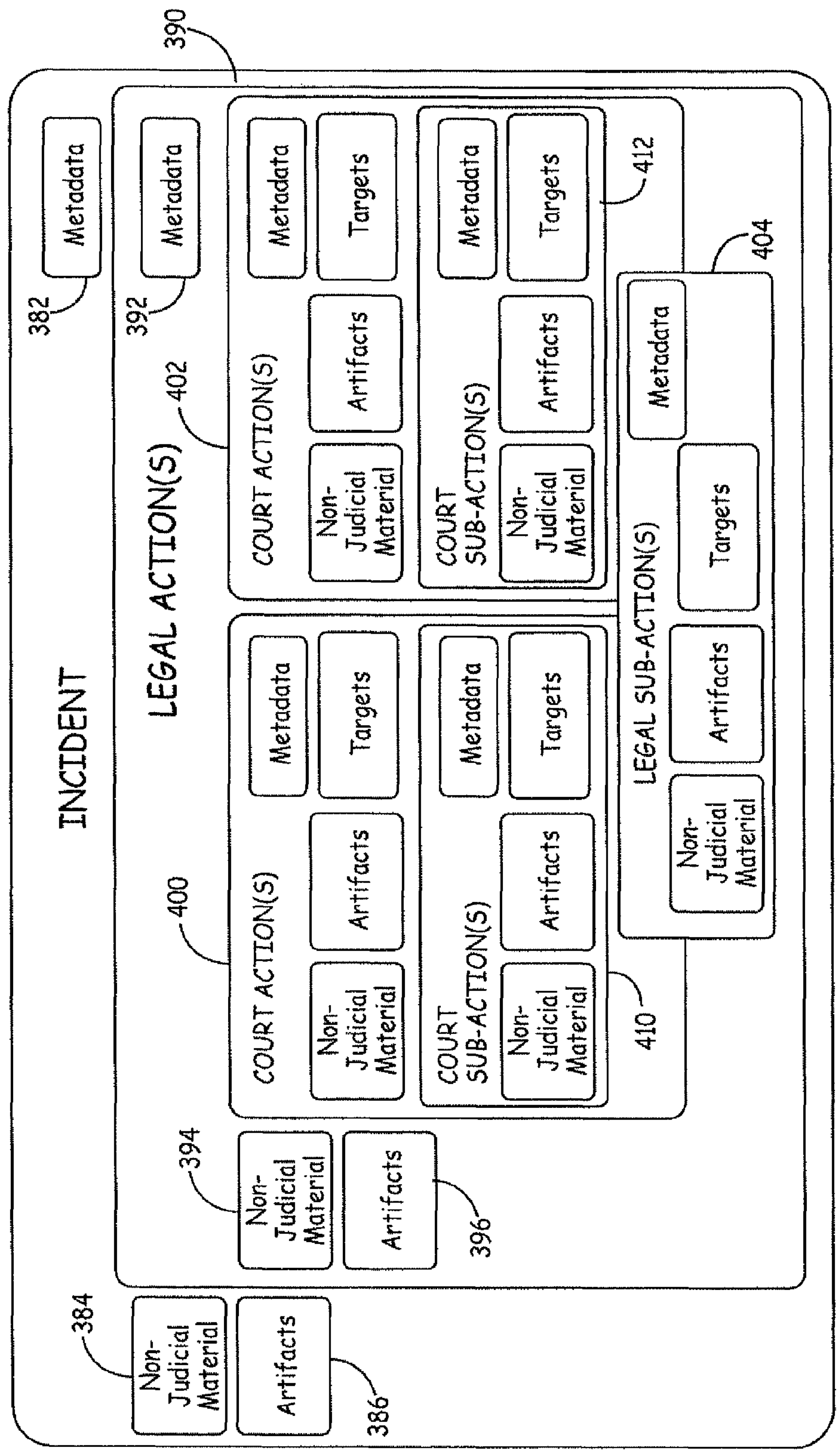
FIG. 10 shows a hierarchical relationship between an incident and sub-incidents in a system for managing electronically stored information.

FIG. 10 is a diagram showing a framework for an incident container component 380 in connection with legal actions. As illustrated in FIG. 10, the overall incident container component 380 includes metadata 382, as well as non-judicial materials 384 and artifacts 386. A number of legal actions are provided within the incident container component 380. The legal action container component 390 includes metadata 392, non-judicial material 394 and artifacts 396, court action components 400, 402 and legal sub-action component 404. The court action components 400 and 402 are illustrated as including metadata, targets, artifacts and non-judicial material. The exemplary targets are used as place holders for filings or materials which have not yet been received such as briefs, specific testimony, etc. Further, the court action container components 400, 402 contain court sub-action container components 410, 412, respectively, which again include metadata, targets, artifacts, and non judicial materials. As discussed above, examples of a sub-action is a particular motion brought within a court proceeding. Further, the legal action can include any number of legal sub-actions. For example, Case A is being appealed on multiple grounds including admissibility of expert evidence. A legal sub-action container can be created to contain all the expert artifacts from the various court levels related to the challenged expert. The difference between a court sub-action container and a legal sub-action container is the court sub-action container groups artifacts from the same court level whereas a legal sub-action container groups artifacts from multiple court levels. The legal sub-action container illustrated in FIG. 10 includes metadata, targets, artifacts and non-judicial material. The metadata includes a relationship component which provides relationship information which relates an incident, or sub-incident, and an artifact. In this example, legal actions 390, court actions 400 and legal sub-actions 404 are all examples of sub-incident container components. The sub-incident container components may be arranged in a hierarchically manner in which one container is within (or "below") another container, may be arranged in a parallel configuration, or may be arranged in both a hierarchical configuration and a parallel configuration. In this specific example, an incident refers to an entity that includes relationships between one or more legal actions arising out of the same event or a series of events.

Figure 11:
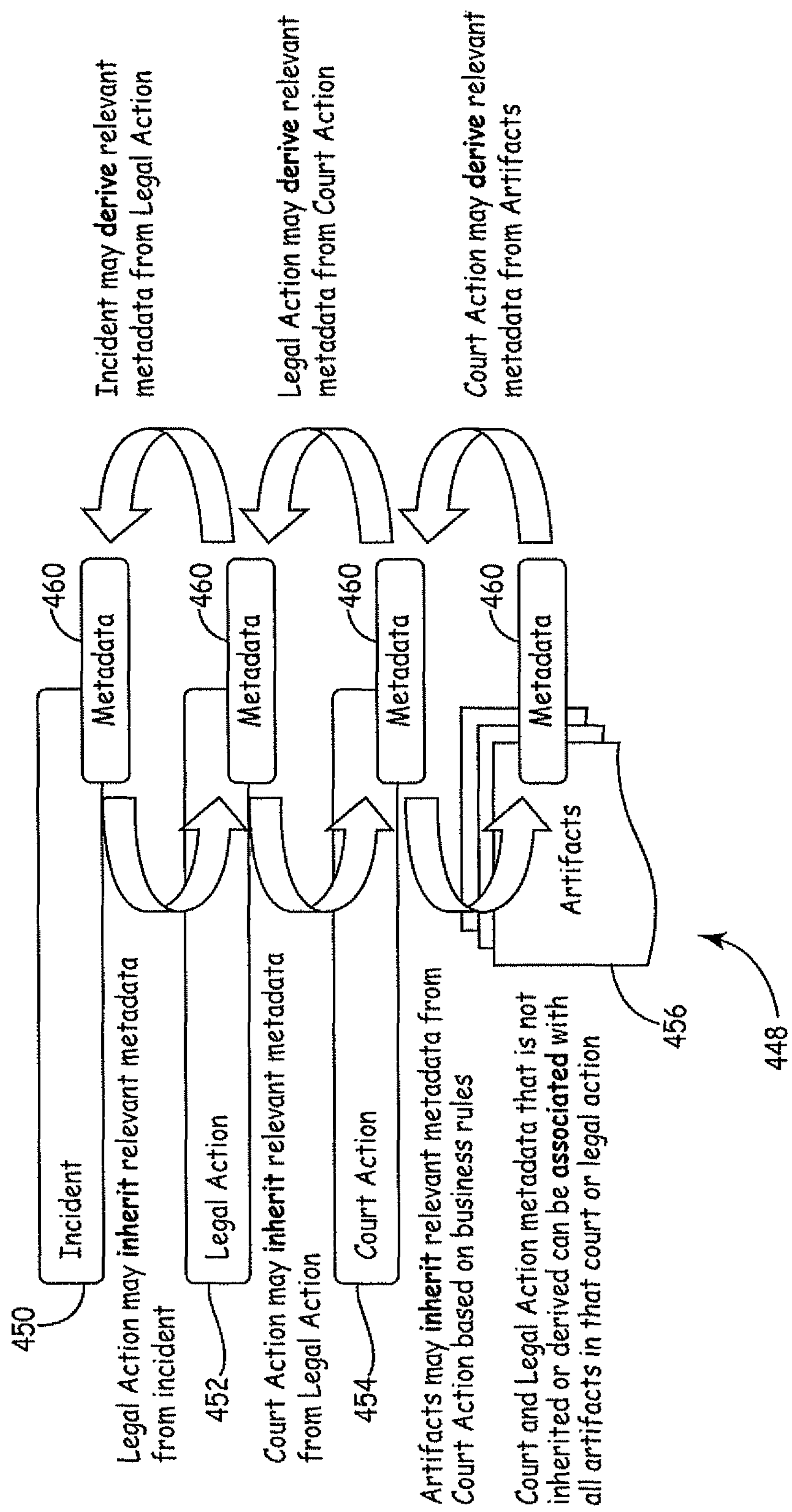
FIG. 11 illustrates a configuration in which an incident or a sub-incident inherits or derives metadata from another incident or sub-incident.

FIG. 11 is a diagram 448 showing the relationship between incident container component 450, legal action container component 452, court action container component 454 and artifacts 456 as provided by metadata 460. As illustrated in FIG. 11, a legal action inherits relevant metadata 460 from an incident. Similarly, a court action inherits relevant metadata 460 from a legal action. Artifacts inherit relevant metadata 460 from court actions. Further, metadata 460 that is not inherited or derived is associated with all artifacts within a particular court or legal action. Working back "up" the hierarchy, metadata 460 is derived from relevant metadata 460 in a sub-incident. For example, a court action derives relevant metadata 460 from artifacts while a legal action derives relevant metadata 460 from a court action and an incident derives relevant metadata 460 from a legal action. Although not illustrated in FIG. 11, this inheritance or derivation may span levels and is not limited to the configuration shown in FIG. 11. Although element 460 is used to identify all of the metadata shown in FIG. 11, the metadata can comprise individual components.

As discussed above, the metadata is used to "editorialize" the various artifacts and incidents. Initially, an exemplary embodiment, an automated process is used to identify or complete relevant metadata. For example, related actions are identified using metadata fields directed to the title of a matter, the filing date, a particular court venue, the docket number or other information such as county, parties, etc. The results are scored and candidates are accepted or rejected based upon their score. The relationships are marked for manual editorial review if warranted. The data is editorialized using the web interface discussed above such that information is created, retrieved, updated, deleted, etc. as desired. Rules are developed for use in the automation of the editorial process. A tool modifies the rules for a particular venue, jurisdiction, artifact type, etc. Similar tools are used for legal actions.

Using the system described above, various application components, such as those illustrated in FIG. 5, are implemented to operate on stored information. Exemplary application components include a viewing component which is used to view metadata from a court action for all the artifacts that belong within a court action or legal action. Extensions to this application component provide the user with the ability to apply metadata value from one artifact to another artifact. In addition, the application component assists in the detection and review of duplicate artifacts such that duplicates may be removed from the database 24. If the metadata includes information related to the completeness of the artifact, and the amount that the artifact has been referenced, this information is used to assign a greater importance with completing a missing artifact or a partially completed court action, legal action and/or incident. In another example, court actions are classified based upon classifications applied to artifacts within a particular court action. For example, if a court action includes artifacts related to patents, an application component is used to infer that the court action relates to Intellectual Property.

Another exemplary application component is configured to provide a mass change in which editorial revisions are applied across metadata entries related to multiple artifacts. Artifacts are also reclassified to an action in which other artifacts in the same court action presented that have the same classification either directly or through hierarchical mapping. An application component is provided to perform a consistency check in which a validation is performed across artifacts for a selected type of data, such as classifications or venue. Similarly, an application component tracks which artifacts are contributing metadata to a particular court action.

Although the present invention has been described with reference to preferred embodiments, workers skilled in the art will recognize that changes may be made in form and detail without departing from the spirit and scope of the invention. Various types of communication techniques can be used to communicate data between application components. For example, a communication component can "listen" to all communications and only respond to communications which are directed to it, for example, by an addressing scheme, polling techniques can be used, event driven communication techniques can be implemented as well as timed based communications. If addressing techniques are employed, the application components, or at least their internal communication components, should have an address associated therewith. The address may be unique, or may be shared between components as desired.

What is claimed is:

1. A system for managing electronically stored information, comprising:

a server including a processor and a memory;

a database coupled to the server;

a container component configured in the memory, the container component configured to store and retrieve incident information from the database, the incident information comprising metadata relating to an incident; and a relationship component configured in the memory to infer, using a classification based on the incident information relating to the incident, a relationship between the container component and a plurality of artifacts, wherein the container component derives at least a portion of the metadata from the plurality of artifacts.

2. The system of claim 1 wherein at least one of the plurality of artifacts comprises artifact metadata without comprising actual content of the artifact.

3. The system of claim 1 wherein the incident information further comprises an indicator of completeness of the incident, wherein the indicator of completeness indicates whether one or more artifacts are not yet included in the container component, and wherein the incident information further comprises an indication of an amount that each of the one or more artifacts has been referenced, and an indication of an importance associated with completing the container component, wherein the indication of the importance is based on the indicator of completeness and the indication of the amount that each of the one or more artifacts has been referenced.

4. The system of claim 1 further comprising a second container component configured in the memory, the second container component configured to store and retrieve sub-incident information from the database, the sub-incident information comprising at least one of metadata and actual data relating to a sub-incident of the incident; and wherein the relationship component is configured in the memory to provide, using the sub-incident information related to the incident, a relationship between the second container component and at least one of the plurality of artifacts.

5. The system of claim 4 wherein at least a portion of the sub-incident information is inherited from the incident information.

6. The system of claim 4 wherein at least a portion of the incident information is derived from the sub-incident information.

7. The system of claim 1 further comprising an application component configured to (1) infer that at least one of the plurality of artifacts relates to a topic classification, and (2) apply the topic classification to the incident.

8. The system of claim 1 wherein the container component is identified with a surrogate key.

9. The system of claim 4 wherein the second container component is identified with a surrogate key.

10. The system of claim 1, wherein the incident corresponds to a transaction or event giving rise to at least one legal action.

11. One or more computer-readable media having computer-executable instructions embodied thereon, the instructions comprising a plurality of components for managing electronically stored information, the plurality of components comprising:

an incident container component that contains incident information, the incident information comprising metadata relating to an incident;

a relationship component that provides a relationship between the incident container component and a plurality of artifacts, wherein the container component derives at least a portion of the metadata relating to the incident from the plurality of artifacts; and an application component that performs an operation on at least a portion of the incident information, wherein the application component is configured to:

receive, from a user, edited metadata associated with the incident, the edited metadata comprising one or more edits provided by the user; and search for an additional incident container component that includes metadata associated with an additional incident that should receive edits similar to the one or more edits provided by the user.

12. The media of claim 11, further comprising a second container component configured in the memory, the second container component configured to store and retrieve sub-incident information from the database, the sub-incident information comprising at least one of metadata and actual data relating to a sub-incident of the incident.

13. The media of claim 11, wherein at least a portion of the sub-incident information is inherited from the incident information.

14. The media of claim 11, wherein at least a portion of the incident information is derived from the sub-incident information.

15. The media of claim 11, the components further comprising an automated process that associates at least one of the plurality of artifacts with the container component, wherein the automated process includes at least one of a confidence index and a threshold amount for determining whether the at least one of the plurality of artifacts should be manually reviewed.

16. The media of claim 11, wherein the container component contains at least one of the plurality of artifacts.

17. A method for managing electronically stored information, the method comprising:

creating an incident container component in a memory of a computing device, wherein the incident container component is associated with an incident and contains incident information;

creating a first sub-incident container component within the incident container component, the first sub-incident container component corresponding to a first legal action;

creating a second sub-incident container component within the incident container component, the second sub-incident container component corresponding to a second legal action;

receiving a first artifact;

associating, using a processor, the first artifact with the sub-incident container component;

receiving metadata associated with the first artifact;

implementing an application component that infers a relationship between the first artifact and a second artifact, wherein the second artifact is stored in the memory of the computing device; and associating at least a portion of the metadata with the second artifact.

18. The method of claim 17, further comprising deriving a first set of the metadata from the first artifact and storing the first set of metadata within the sub-incident container component.

19. The method of claim 18, further comprising deriving a second set of metadata from the first set of metadata and storing the second set of metadata within the incident container component.

20. The method of claim 17, further comprising creating a court action container component within the first sub-incident container component.

21. A system for managing electronically stored information, comprising:

a server including a processor and a memory;

a database coupled to the server;

a container component configured in the memory, the container component configured to store and retrieve incident information from the database, the incident information comprising metadata relating to an incident, wherein the incident corresponds to a transaction or event giving rise to at least one legal action; and a relationship component configured in the memory to infer, using a classification based on the incident information relating to the incident, a relationship between the container component and a plurality of artifacts, wherein the container component derives at least a portion of the metadata from the plurality of artifacts.

* * * * *